(No Model.)
A. K. CROSS.
DRILLING DEVICE.
No. 388,637. Patented Aug. 28, 1888.
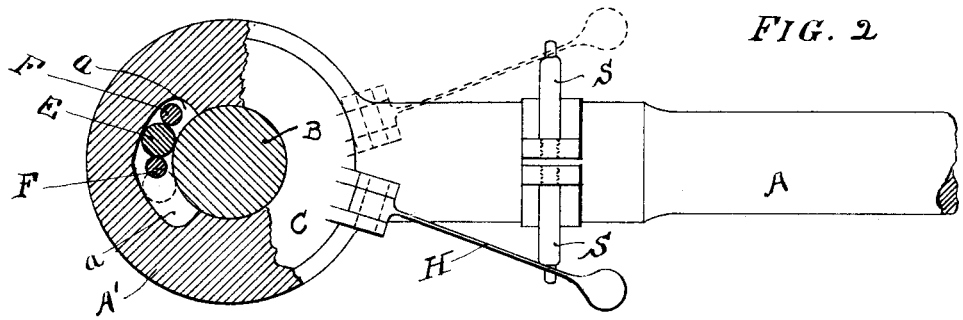
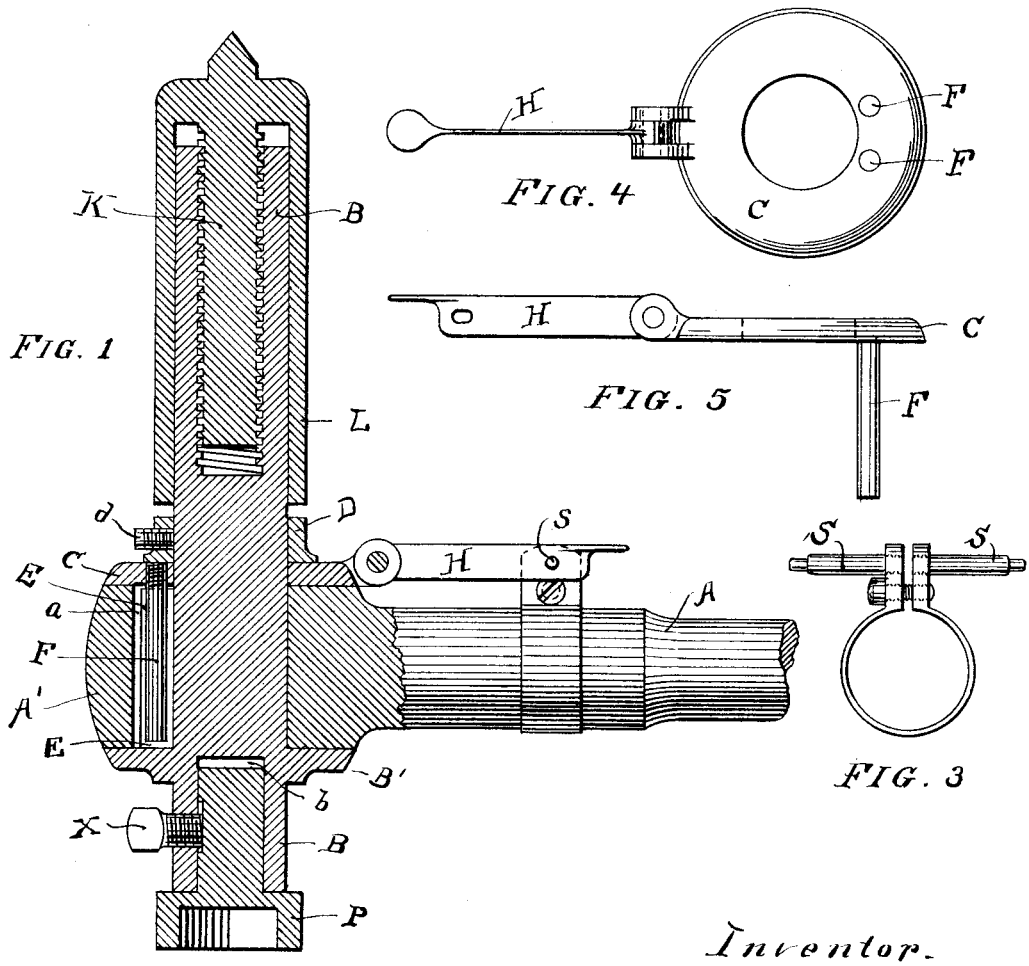
Witnesses:
J. E. Sweeney.
C. A. Shaw.
Inventor.
Anson K. Cross.
per A. K. Cross.
Attorney.

UNITED STATES PATENT OFFICE.

ANSON K. CROSS, OF BOSTON, MASSACHUSETTS.

DRILLING DEVICE.

SPECIFICATION forming part of Letters Patent No. 388,637, dated August 28, 1888.

Application filed November 11, 1887. Serial No. 254,903. (No model.)

*To all whom it may concern:*

Be it known that I, ANSON K. CROSS, a citizen of the United States, residing at Boston, in the county of Suffolk and State of Massachusetts, have invented certain new and useful Improvements in Drilling Devices, of which the following is a specification.

My invention has for its object simplicity of construction and the instant change from right to left handed motion in friction-clutches. These objects are attained by means of the mechanism illustrated in the accompanying drawings, in which—

Figure 1 is a front view showing the head and part of the handle of a friction-drill chosen to show my improvements, the handle being in elevation and the other parts showing the section made by a plane passing through the center of the spindle. Fig. 2 is a plan view of the same, a part showing a cross-section through the center of the hub. Fig. 3 is an end view of the strap which carries the arms which secure the regulating-spring. Fig. 4 is a plan view of the washer with its spring and arms by which the friction-roller is moved to reverse the motion. Fig. 5 is an elevation of the same.

Similar reference-letters indicate corresponding parts throughout the several views.

I am aware that clutches have long been used in which motion is transmitted through the friction of a roller placed in a tapering slot made in either of the parts to be connected, and I claim as new simply the placing of the roller in a slot tapering in both directions, and means whereby the roller may be held at will in either end of this slot, thus providing for the reversing of the motion, and giving a form of clutch especially well adapted to be used in place of ratchet-wheels in hand-drills, bit-stocks, socket-wrenches, &c.

In Fig. 1, A is the handle of the drill; A', its hub, which is bored to fit the spindle B. The hub A' rests on the collar B' of the spindle B, and has above it the washer C. The hub A' and washer C are confined between the collar B' and the washer D, which is secured to the spindle B by the set-screw d. The hub A' is provided with a slot, a a, which narrows in both directions toward its ends. In this slot a friction-roller, E, is placed, its size being such that when it has been moved a short distance in either direction from the center of the slot a a it bears upon both the spindle B and the hub A', thus connecting the two and causing the spindle to turn with the hub either right or left handed, according to the position of the roller in the slot. The washer C turns freely upon the spindle B. It has two arms, F F, which project into the slot, one on each side of the roller E. A spring-arm, H, is so pivoted to the washer that it may be lifted or depressed, and by it the washer C may be turned in either direction, its arms F F causing the roller to move with it until it presses upon both the spindle and the hub, in which position it may be secured by springing the arm H upon a catch, S, provided for it upon the handle A. This catch may be of any suitable form, and projects far enough from the handle to give such tension to the spring H that the roller may be kept in position. In order to reverse the motion the roller must be freed by a backward motion, when a slight pressure upon the arm H will turn the washer and carry the roller to the other end of the slot, as shown by the dotted lines in Fig. 2.

K is the feeding-screw, which may project from the sleeve L or pass without such covering into the spindle B. The spindle B has in its lower end the socket b, in which the drill is secured by the set screw X.

The combination of the above-described parts may be converted into a socket-wrench or screw-driver by securing in the socket b whatever size of wrench it may be desired to use, a number of interchangeable sockets being provided for such use.

Having fully described my invention, what I desire to claim and secure by Letters Patent is—

1. In a friction-clutch, the combination of a shaft and a lever having a head fitting loosely about the shaft with a friction-roller or clamping-piece placed in a double-tapering chamber formed in either the shaft or the head of the lever, and means whereby the friction-roller may be placed at will in either end of said chamber and there retained in contact with both the shaft and the hub, thus serving to transmit motion from one part to the other, the motion being right or left handed, according to the position of the roller in the chamber.

2. In a reversible friction-clutch, the combination of the spindle B, hub A', provided with a double-tapering chamber, $a\,a$, and roller E, with the washer C, having the arms F F, and spring-lever H, substantially as and for the purpose specified.

3. In a friction drill, the combination of the spindle B, feeding-screw K, collar B', and washer D, with a handle, A, its hub A', fitting about the spindle B and provided with a double-tapering chamber, $a\,a$, the roller E, and the washer C, having the arms F F and spring-lever H, and catch S, all constructed and operating substantially as and for the purpose specified.

ANSON K. CROSS.

Witnesses:
C. A. SHAW,
C. L. HUNT.